(12) United States Patent
Miura et al.

(10) Patent No.: US 10,761,780 B2
(45) Date of Patent: Sep. 1, 2020

(54) MEMORY SYSTEM

(71) Applicant: TOSHIBA MEMORY CORPORATION, Minato-ku, Tokyo (JP)

(72) Inventors: Takeshi Miura, Kamakura Kanagawa (JP); Kenta Inakagata, Ota Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/291,891

(22) Filed: Mar. 4, 2019

(65) Prior Publication Data

US 2019/0391760 A1 Dec. 26, 2019

(30) Foreign Application Priority Data

Jun. 25, 2018 (JP) .................................. 2018-119548

(51) Int. Cl.
  *G06F 12/00* (2006.01)
  *G06F 3/06* (2006.01)

(52) U.S. Cl.
  CPC .......... *G06F 3/0659* (2013.01); *G06F 3/0604* (2013.01); *G06F 3/064* (2013.01); *G06F 3/068* (2013.01)

(58) Field of Classification Search
  None
  See application file for complete search history.

(56) References Cited

U.S. PATENT DOCUMENTS

| | | | |
|---|---|---|---|
| 2012/0233382 A1 | 9/2012 | Yamanaka et al. | |
| 2013/0275650 A1 | 10/2013 | Hida et al. | |
| 2014/0032817 A1* | 1/2014 | Bux ..................... | G06F 12/0261 711/103 |
| 2016/0103617 A1* | 4/2016 | Kang .................... | G06F 3/0608 711/103 |
| 2016/0179399 A1* | 6/2016 | Melik-Martirosian ...................... | G06F 3/0653 711/103 |
| 2016/0188220 A1 | 6/2016 | Nemoto et al. | |

(Continued)

FOREIGN PATENT DOCUMENTS

| | | |
|---|---|---|
| JP | 2012-141946 A | 7/2012 |
| JP | 5330432 B2 | 10/2013 |
| JP | 2016-122227 A | 7/2016 |

*Primary Examiner* — John A Lane
(74) *Attorney, Agent, or Firm* — Foley & Lardner LLP

(57) ABSTRACT

A memory system includes a first volatile semiconductor memory, a second nonvolatile semiconductor memory that includes a plurality of blocks, and a controller configured to store management information in the first semiconductor memory in which identification information of the blocks and corresponding numbers of valid clusters of the blocks are stored and respectively associated with each other. The controller includes a block management unit configured to generate an update instruction to update the number of valid clusters associated with a block in which data is to be written, according to a write request received from a host, and a first memory controller configured to read, from the first semiconductor memory, the number of valid clusters corresponding to the update instruction, update the read number of valid clusters by an update amount corresponding to the update instruction, and write the updated number of valid clusters back to the first semiconductor memory.

20 Claims, 13 Drawing Sheets

(56) References Cited

U.S. PATENT DOCUMENTS

| | | | |
|---|---|---|---|
| 2016/0283369 A1* | 9/2016 | Hada | G06F 12/0246 |
| 2017/0083436 A1* | 3/2017 | Jung | G06F 12/0246 |
| 2017/0168929 A1* | 6/2017 | Kanno | G06F 3/0647 |
| 2018/0190329 A1* | 7/2018 | Kathawala | G06F 12/0246 |
| 2019/0220392 A1* | 7/2019 | Lin | G06F 12/0246 |
| 2020/0097403 A1* | 3/2020 | Saxena | G06F 12/0269 |

* cited by examiner

| LOGICAL ADDRESS (LBA) | PHYSICAL ADDRESS (LOGICAL BLOCK ID + LOGICAL PAGE ID + LOGICAL CLUSTER ID) |
|---|---|
| LBA0 | PHA0 |
| ⋮ | ⋮ |
| LBAk | PHAk |
| ⋮ | ⋮ |

7a

| LOGICAL BLOCK ID | NUMBER OF VALID CLUSTERS |
|---|---|
| BL0 | CC0 |
| ⋮ | ⋮ |
| BLn | CCn |
| ⋮ | ⋮ |

12

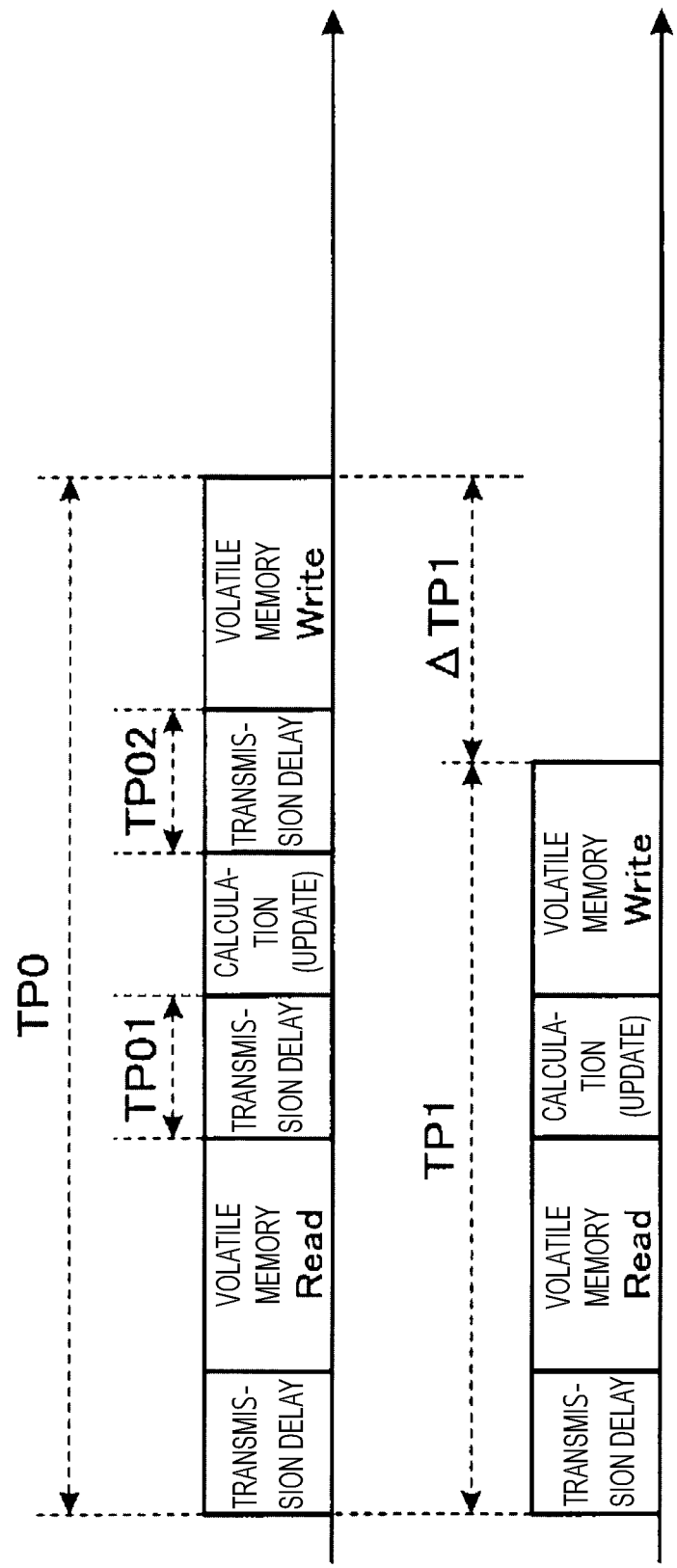

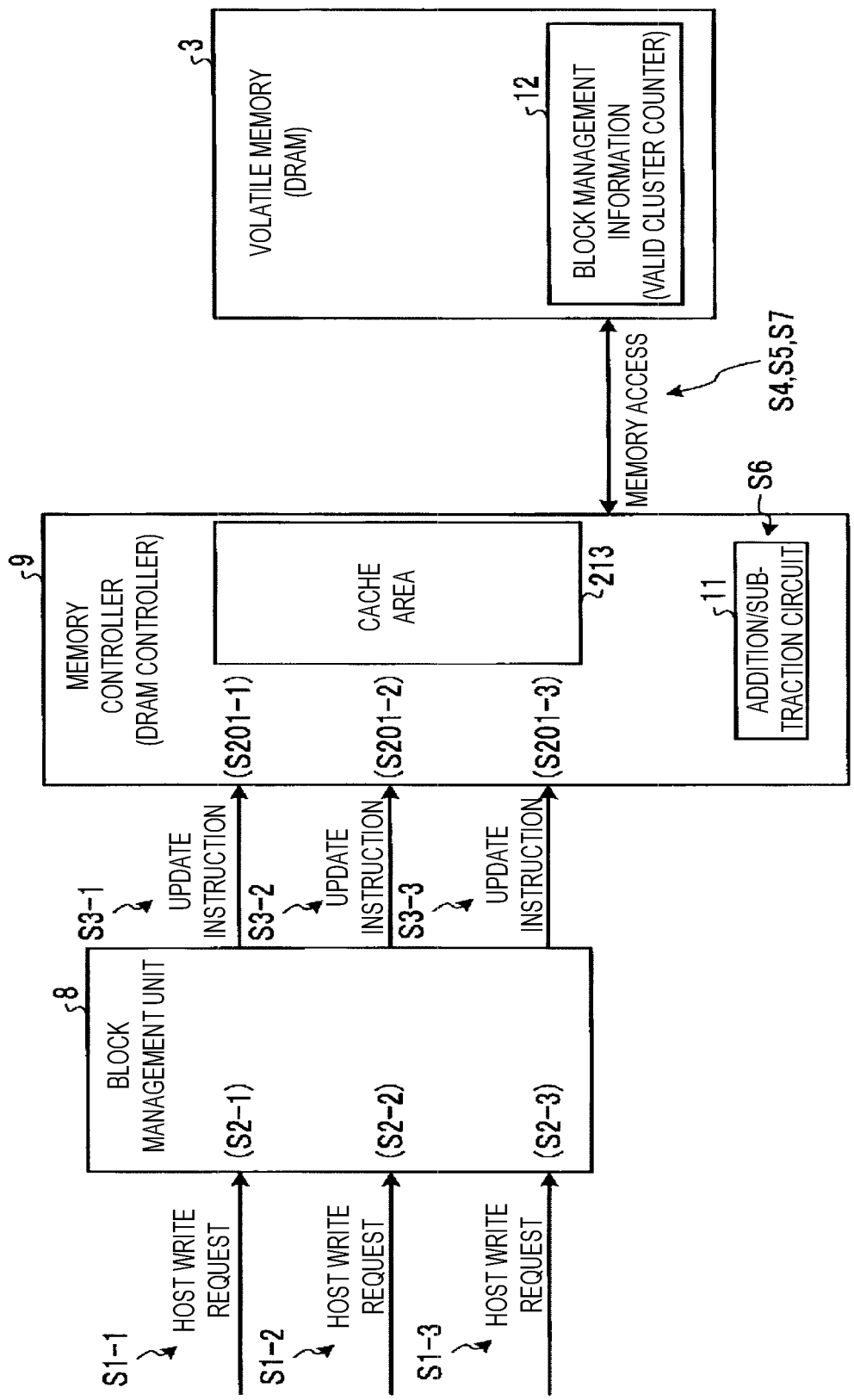

US 10,761,780 B2

MEMORY SYSTEM

CROSS-REFERENCE TO RELATED APPLICATION

This application claims the benefit of and priority to Japanese Patent Application No. 2018-119548, filed Jun. 25, 2018, the entire contents of which are incorporated herein by reference.

FIELD

Embodiments described herein relate generally to a memory system.

BACKGROUND

A memory system such as a solid state drive (SSD) may include a nonvolatile semiconductor memory, such as a NAND type flash memory, as a storage area. The nonvolatile semiconductor memory has multiple blocks, and each block includes multiple clusters. In the memory system, when data is rewritten to the nonvolatile semiconductor memory, an efficiency of use might decrease due to invalid clusters in some blocks. Thus, garbage collection (compaction) is executed in a manner wherein, by referring to management information of the number of valid clusters of each block, from a block in which the number of valid clusters is lower than a threshold, data of valid clusters is collected from the block and rewritten to one or more free blocks, and the data in the original block is erased.

DESCRIPTION OF THE DRAWINGS

FIG. 7 is a view illustrating an improved efficiency of an operation of the memory system according to the embodiment.

FIG. 8 is a data flow diagram illustrating part of a configuration of a memory system and an operation thereof according to a first modification of the embodiment.

DETAILED DESCRIPTION

Figure 1:
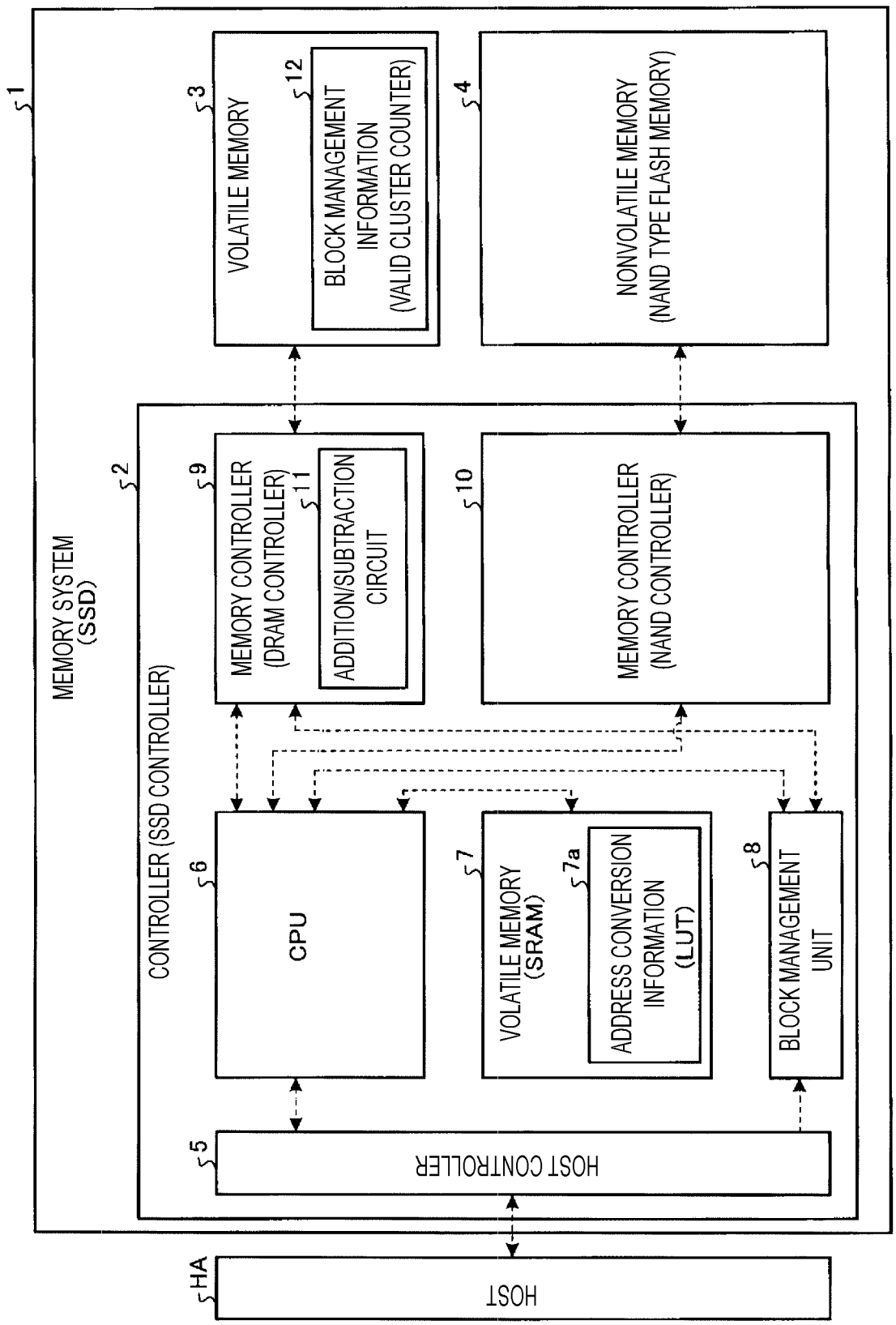
FIG. 1 is a diagram illustrating a configuration of a memory system according to an embodiment.

Embodiments described herein provide a memory system capable of effectively managing a number of valid clusters of one or more memory blocks.

In general, according to one embodiment, a memory system includes a first volatile semiconductor memory, a second nonvolatile semiconductor memory that includes a plurality of blocks each including a plurality of clusters, and a controller configured to store management information in the first semiconductor memory in which identification information of the blocks and corresponding numbers of valid clusters of the blocks are stored and respectively associated with each other. The controller includes a block management unit configured to generate an update instruction to update the number of valid clusters associated with a block in which data is to be written, according to a write request received from a host, and a first memory controller configured to read, from the first semiconductor memory, the number of valid clusters corresponding to the update instruction, update the read number of valid clusters by an update amount corresponding to the update instruction, and write the updated number of valid clusters back to the first semiconductor memory.

Hereinafter, a memory system according to an embodiment will be described in detail with reference to the accompanying drawings. The present disclosure is not limited by the embodiment.

Embodiment

A memory system such as an SSD has a nonvolatile semiconductor memory, such as a NAND type flash memory, as a storage area. The nonvolatile semiconductor memory has multiple blocks as a management unit of data, and each block includes multiple clusters. In the memory system, when data is rewritten to the nonvolatile semiconductor memory, address conversion information is updated accordingly, and an efficiency of use might decrease due to invalid clusters in some clusters. A valid cluster refers to a cluster in which the latest data is stored and of which conversion information with respect to a logical address exists in the address conversion information. An invalid cluster refers to a cluster for which an LBA (logical block addressing) data is erased from the address conversion information and, at the same time, data associated with the LBA is rewritten to another location so that the cluster will no longer be read. Thus, the garbage collection is executed in a manner wherein, by referring to the management information of the number of valid clusters of each block, a block in which the number of valid clusters is lower than a threshold is a source block, and a free block is a destination block, and data of the valid clusters is collected from the source blocks and rewritten to the destination blocks, and the data in the source blocks is erased.

When a block in which the number of valid clusters is relatively small is used as a source block, rather than a block in which the number of valid clusters is relatively large, it is possible to further reduce the number of write operations necessary for executing the garbage collection in the entire memory system. Based on this, the memory system counts the number of valid clusters of each block in order to effectively execute the garbage collection, and maintains block management information in which identification information of a block and the number of valid clusters are associated with each other for each of the multiple blocks. This block management information may be referred to as a valid cluster counter (VCC). For the present embodiment, the present disclosure describes an example where a unit for managing the block management information is a logical block. However, the unit for managing the block management information may be a physical block. The configuration of the logical block is described below. In addition, in the following description, the term "block" indicates a "logical block" when the unit for managing the block management information is a logical block, but may indicate a "physical block" when the unit for managing the block management information is a physical block. In the memory system, each time a host write request is received from a host, an updating process for increasing or decreasing the number of valid clusters in the block management information may be performed.

In order to effectively execute the updating process, in the memory system, it may be conceived to provide a block management unit and a volatile memory such as a static random access memory (SRAM) in a controller, and cause the block management information to be temporarily stored in the volatile memory of the controller such that the block management unit reads and updates the block management information as necessary. When the capacity of the nonvolatile semiconductor memory in the memory system increases, the number of blocks and the number of clusters per block also increase. Thus, in a large-capacity memory system, the number of bits and the number of words in the block management information tends to increase, and as a result, the data amount of the block management information might exceed the storage capacity of the volatile memory in the controller. When the capacity of the volatile memory in the controller is made large along with the increase of the capacity of the memory system, the cost of the memory system tends to increase.

Meanwhile, in order to allocate the storage area of the block management information while avoiding the increase of the capacity of the volatile memory in the controller, in the memory system, it may be conceived that a volatile memory such as a DRAM is provided outside the controller, and the block management information is stored in the volatile memory outside the controller. For example, when the host write request is received, the number of valid clusters in the block management information is read from the volatile memory outside the controller into a memory controller, and transmitted from the memory controller to the block management unit so as to then be updated in the block management unit. The updated number of valid clusters is transmitted from the block management unit to the memory controller, and written back to the volatile memory outside the controller from the memory controller. In this case, a time for the process of updating the number of valid clusters may increase, as compared to a case where the block management information is stored in a volatile memory of the controller.

Thus, in the memory system according to the present embodiment, the operation to update the number of valid clusters in the controller is performed by a memory controller that serves as an interface (I/F) with respect to a volatile memory outside the controller, rather than the block management unit, so that the time for the process of updating the number of clusters is reduced.

The memory system 1 may be configured as illustrated in FIG. 1. FIG. 1 is a diagram illustrating a configuration of a memory system 1.

The memory system 1 is connected to an outside host HA via a communication bus, so as to function as an external storage device for the host HA. The host HA includes, for example, a personal computer or a CPU core. The memory system 1 includes, for example, an SSD.

The memory system 1 includes a controller 2, a volatile memory 3, and a nonvolatile memory 4. When the memory system 1 is an SSD, the controller 2 may be an SSD controller. The controller 2 may be implemented as a controller package including, for example, a system-on-a-chip (SoC). The controller 2 includes a volatile memory 7 as a cache memory for temporarily storing data.

The volatile memory 3 is disposed outside the controller 2, and may be implemented as a volatile memory package. The volatile memory 3 is a volatile memory that has a slower access speed than that of the volatile memory 7 in the controller 2, but may be relatively inexpensive in unit price per bit, and may be configured to have a larger storage capacity than that of the volatile memory 7. The volatile memory 3 may be, for example, a dynamic random access memory (DRAM).

Figure 2:
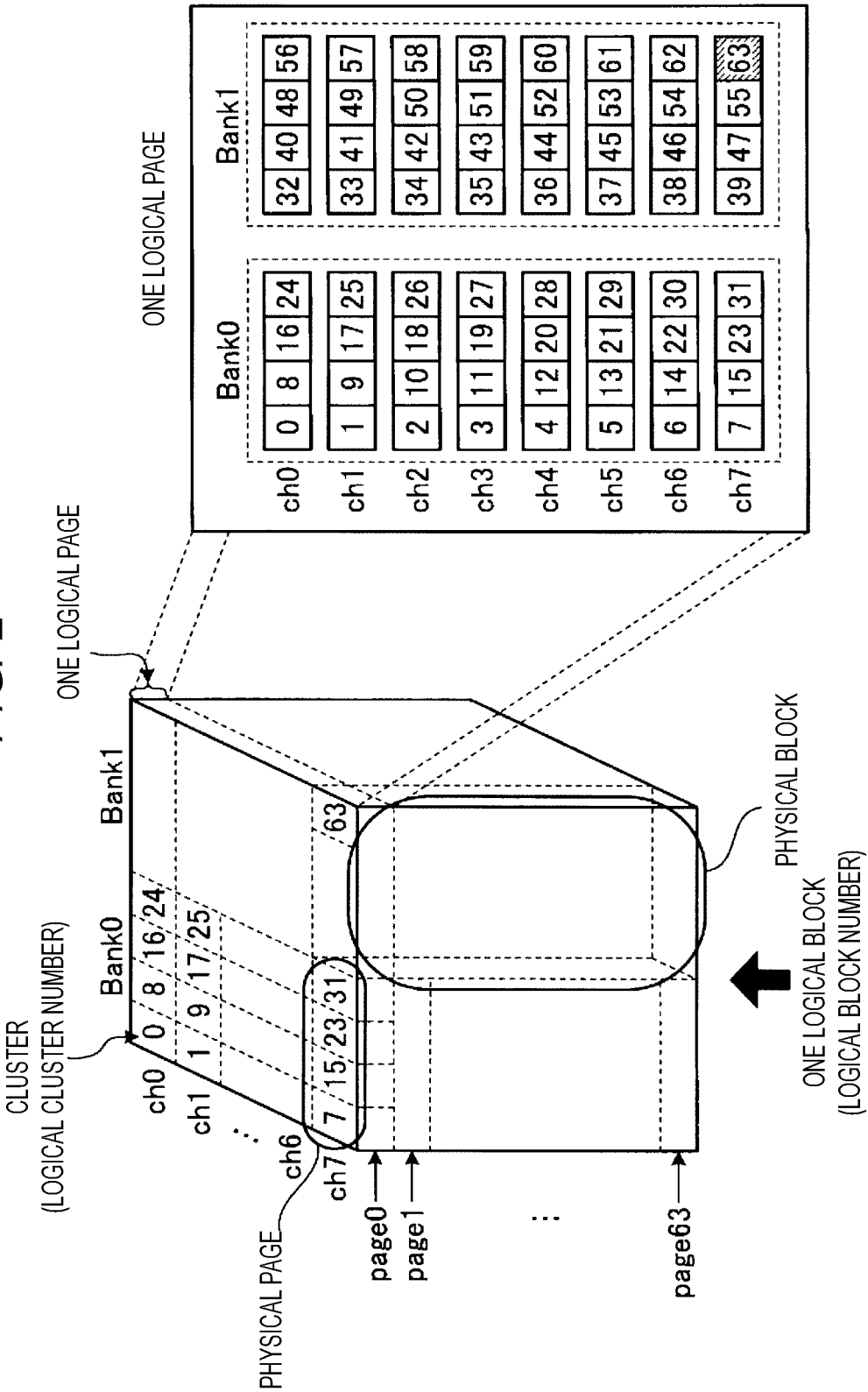
FIG. 2 is a view illustrating a unit for managing data in a nonvolatile memory according to the embodiment.

The nonvolatile memory 4 is disposed outside the controller 2, and may be implemented as a nonvolatile memory package. The nonvolatile memory 4 may be, for example, a NAND type flash memory, but is not limited thereto. The nonvolatile memory 4 may be, for example, a resistance random access memory (ReRAM), a phase change RAM (PRAM), a magnetoresistive random access memory (MRAM), or a ferroelectric random access memory (Fe-RAM). The nonvolatile memory 4 has multiple physical blocks. Each physical block can be a unit for data erase. Each physical block has multiple memory cells. Each memory cell is capable of storing multiple values. In each physical block, a memory cell group connected to a same word line is treated as one physical page when each memory cell is a single-level cell, treated as two physical pages when each memory cell is a multi-level cell, and treated as three physical pages when each memory cell is a triple-level cell. A unit for managing data in the nonvolatile memory 4 may be configured as illustrated in FIG. 2. FIG. 2 is a view illustrating the unit for managing data in the nonvolatile memory 4.

The nonvolatile memory 4 may include multiple memory chips. In the respective memory chips, a unit in which access of data write and data read can be performed is a physical page. A physical block is a minimum unit in which data erase can be independently performed and includes multiple physical pages. The example illustrated in FIG. 2 represents a case where a memory chip is connected to eight channels ch0 to ch7. The controller 2 is capable of controlling the respective channels ch0 to ch7 in parallel. Further, the controller 2 is capable of performing multiple parallel operations on the respective channels ch0 to ch7 by a bank interleave. Accordingly, 16 physical pages which are substantially writable/readable in parallel may constitute one logical page that serves as a data write area, and 16 physical blocks which are substantially erasable in parallel may constitute one logical block that serves as a data block. The garbage collection may be performed in the unit of one logical block.

In addition, it is assumed that data in the nonvolatile memory 4 is managed by a CPU 6 of the controller 2 in a cluster unit which is a smaller unit for managing data than that of one physical page. The size of a cluster is equal to or more than a size of a sector which is the smallest unit of access from the host HA, and is determined such that a natural number multiple of the size of a cluster becomes the size of the physical page. For example, one physical page may include four clusters, and one logical page may include 64 clusters. In addition, in the present embodiment, data is stored in order of cluster number, in order to write the data in parallel in the respective channels.

Referring back to FIG. 1, the controller 2 controls each unit in the memory system 1. The controller 2 includes a host controller 5, a processor (central processing unit (CPU)) 6, a block management unit 8, a memory controller 9, and a memory controller 10, in addition to the volatile memory 7.

The CPU 6 controls the units in the controller 2 by executing firmware.

The host controller 5 performs an interface operation with respect to the host HA under the control of the CPU 6. The host controller 5 supplies a command and/or data received from the host HA to the CPU 6 and/or the block management unit 8. For example, when a host write request and write data are received from the host HA, the host controller 5 transmits the host write request and the write data to the CPU 6, and simultaneously, transmits the host write request to the block management unit 8. Further, the host controller 5 transfers a notification and/or data supplied from the CPU 6 to the host HA.

The memory controller 9 performs an interface operation with respect to the volatile memory 3 under the control of the CPU 6. When the volatile memory 3 is a DRAM, the memory controller 9 may be a DRAM controller. Further, the memory controller 9 includes an addition/subtraction circuit 11. The addition/subtraction circuit 11 is used for updating the number of valid clusters.

The memory controller 10 performs an interface operation with respect to the nonvolatile memory 4 under the control of the CPU 6. When the nonvolatile memory 4 is a NAND type flash memory, the memory controller 9 may be a NAND controller.

The volatile memory 7 is disposed in the controller 2, and may be implemented as a circuit in the controller 2 (in a controller package). The volatile memory 7 is a volatile memory that has a faster access speed than that of the volatile memory 3, but may be relatively expensive in unit price per bit, and may be configured to have a smaller storage capacity than that of the volatile memory 3. The volatile memory 7 may be, for example, an SRAM.

The volatile memory 7 stores address conversion information 7a. The address conversion information 7a is information used for a conversion between a logical address and a physical address for an access to the nonvolatile memory 4, and may include a lookup table (LUT). The address conversion information 7a may be updated each time the access to the nonvolatile memory 4 from the host HA (e.g., host write or host read) is performed.

Figure 3:
FIG. 3 is a view illustrating a data structure of address conversion information according to the embodiment.

The address conversion information 7a has, for example, a data structure illustrated in FIG. 3. FIG. 3 is a view illustrating the data structure of the address conversion information 7a. FIG. 3 illustrates an example where the address conversion information 7a is configured in a table form (as a logical-to-physical address conversion table). In the address conversion information 7a, a logical address and a physical address are associated with each other. The logical address may be, for example, a logical block address (LBA). The physical address may be a combination of identification information of a logical block (e.g., a logical block ID) and identification information of a logical cluster (e.g., a logical page identifier (ID) and a logical cluster ID).

For example, by referring to the address conversion information 7a illustrated in FIG. 3, it may be determined that the logical address LBA0 and the physical address PHA0 are associated with each other, and the logical address LBAk and the physical address PHAk are associated with each other.

The block management unit 8 illustrated in FIG. 1 manages each block in the nonvolatile memory 4. For example, when the memory system 1 is powered on, the CPU 6 controls the memory controllers 9 and 10 to read the block management information 12 stored in a management information storage area of the nonvolatile memory 4 and store the block management information 12 in the volatile memory 3.

Figure 4:
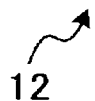
FIG. 4 is a view illustrating a data structure of block management information according to the embodiment.

The block management information 12 is management information in which identification information of a block and the number of valid clusters are associated with each other for each of the multiple blocks, and may be referred to as a valid cluster counter. The block management information 12 has, for example, a data structure illustrated in FIG. 4. FIG. 4 is a view illustrating the data structure of the block management information 12 (valid cluster counter). FIG. 4 illustrates a case where the block management information 12 is configured in a table form (i.e., as a valid cluster counter table). In the block management information 12, identification information of a logical block (e.g., a logical block ID) and the number of valid clusters are associated with each other. For example, by referring to the block management information 12 illustrated in FIG. 4, it may be determined that the number of valid clusters of the logical block BL0 is "CC0," and that the number of valid clusters of the logical block BLn is "CCn."

Figure 5:
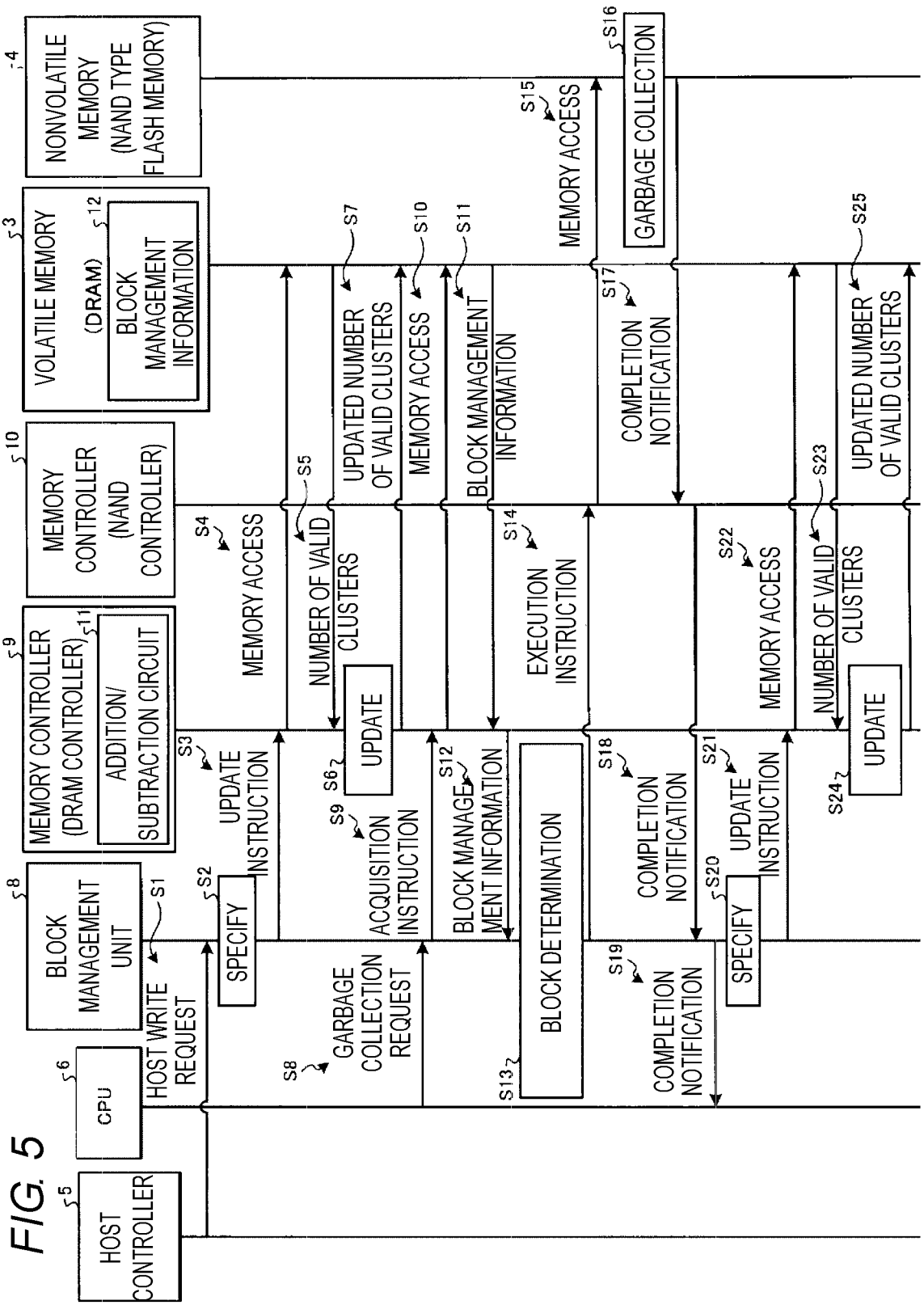
FIG. 5 is a sequence diagram illustrating an operation of the memory system according to the embodiment.
Figure 6A:
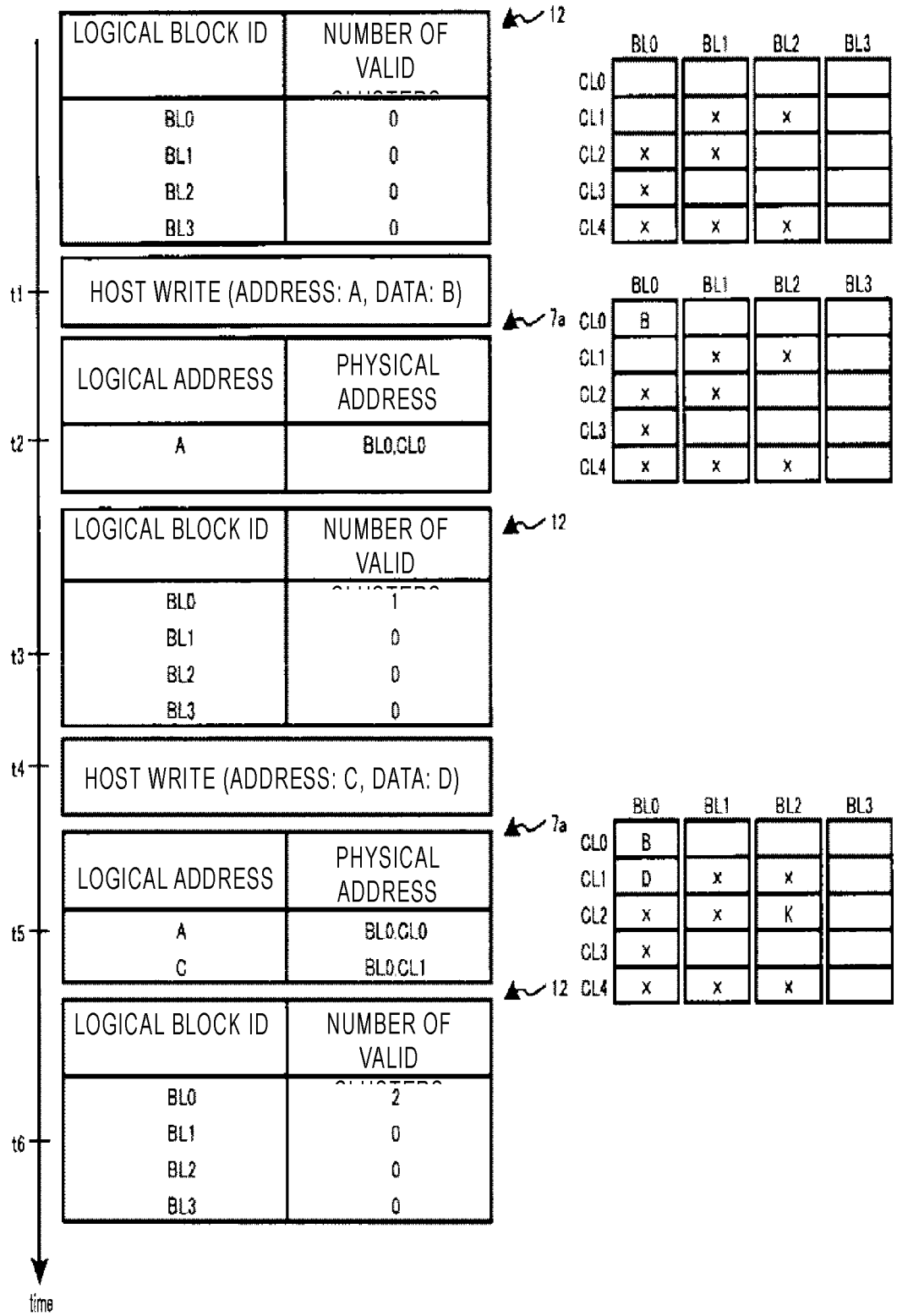
FIGS. 6A and 6B are views illustrating an example of the operation of the memory system according to the embodiment.
Figure 6B:
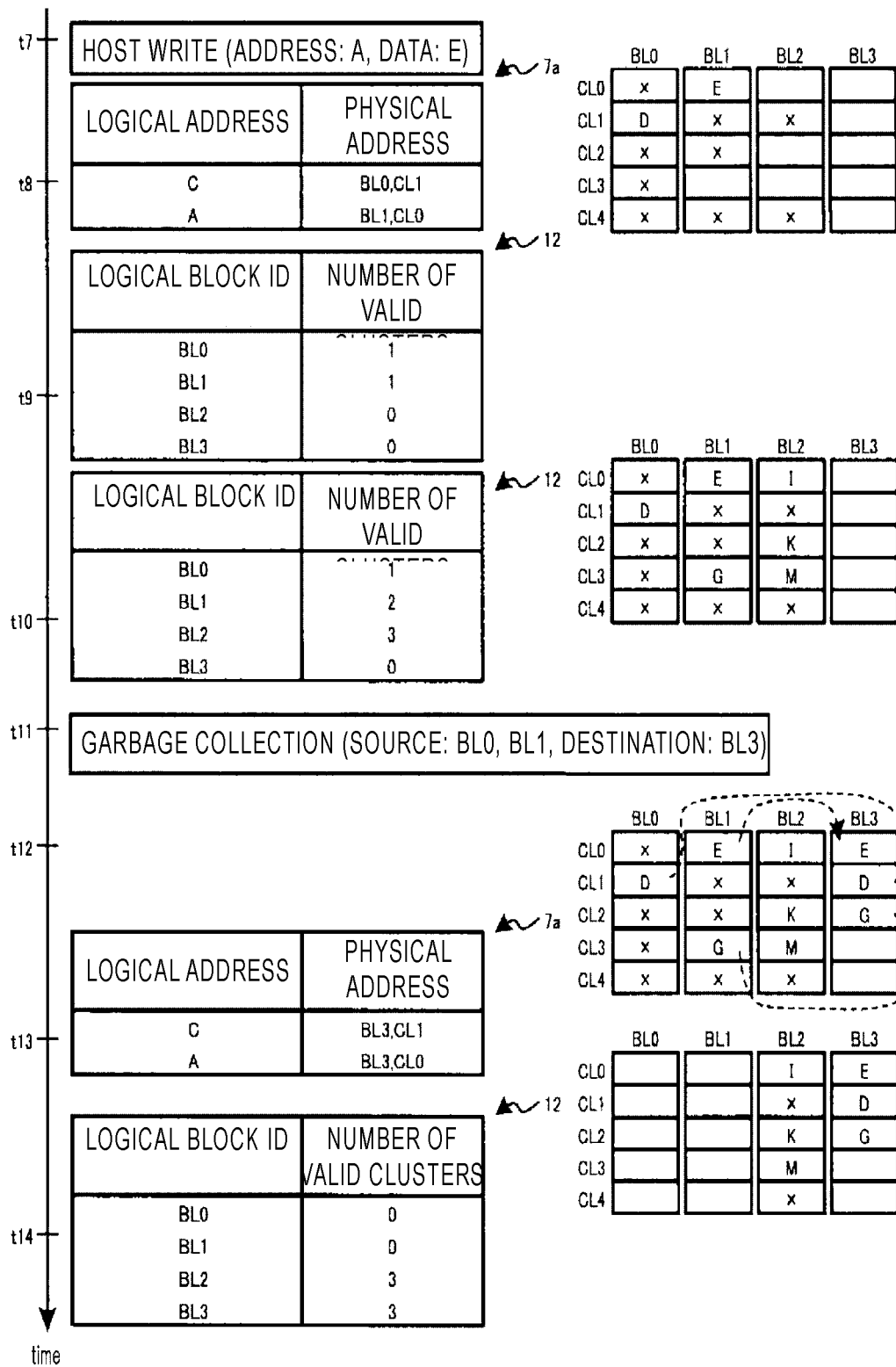

The block management information 12 may be updated as illustrated in FIGS. 5, 6A and 6B. FIG. 5 is a sequence diagram illustrating the operation of the memory system 1. FIGS. 6A and 6B are views illustrating an example of the operation of the memory system 1.

When a host write request is received (S1), the block management unit 8 specifies a block to which the write is to be performed in the nonvolatile memory 4, according to the host write request. The block management unit 8 specifies a logical block corresponding to the host write request by, for example, referring to the address conversion information 7a stored in the volatile memory 7 (S2). The block management unit 8 generates an update instruction to update the number of valid clusters of the specified logical block, and supplies the update instruction to the memory controller 9 (S3). The update instruction to update the number of valid clusters includes an update amount associated with the identification information of the block. The identification information of the block includes the identification information (e.g., a logical block ID) of the logical block in which the number of valid clusters is to be updated. The update amount includes an amount of the update of the number of valid clusters (e.g., increment (+1) or decrement (−1)).

Accordingly, the memory controller 9 accesses the volatile memory 3 (S4), to read the number of valid clusters corresponding to the update instruction (S5). The memory controller 9 updates the read number of valid clusters by the update amount corresponding to the update instruction, by using the addition/subtraction circuit 11 (S6). When the update amount corresponding to the update instruction is "+1," the addition/subtraction circuit 11 increments the number of valid clusters by +1. When the update amount corresponding to the update instruction is "−1," the addition/subtraction circuit 11 decrements the number of valid clusters by −1. The memory controller 9 writes the updated number of valid clusters back to the volatile memory 3 (S7). As a result, the block management information 12 stored in the volatile memory 3 is updated. In addition, when an execution of a host write by the memory controller 10 has been completed, the controller 2 may perform a notification of the completion of the write corresponding to the host write request from the host controller 5 to the host HA after the completion of S6 or after the completion of S3 without waiting for S6 to be completed.

FIGS. 6A and 6B illustrate an example of the operation of the memory system 1 in a case where the nonvolatile memory 4 has four logical blocks BL0 to BL3 and each of the logical blocks BL0 to BL3 has five logical clusters CL0 to CL4. In the following description, a function which is described to be executed by the CPU 6 may be executed by a predetermined dedicated circuit, or a function which is described to be executed by a predetermined dedicated circuit may be executed by the CPU 6. In addition, in the right portions of FIGS. 6A and 6B, the squares having a symbol "x" therein indicate invalid clusters, and the blank squares indicate already erased and unwritten clusters.

Before a timing t1, the logical clusters CL2 to CL4 in the logical block BL0, the logical clusters CL1, CL2, and CL4 in the logical block BL1, and the logical clusters CL1 and CL4 in the logical block BL2 are invalid clusters, and the logical block BL3 is a free block.

In the block management information 12, the number of valid clusters in each of the logical blocks BL0, BL1, BL2, and BL3 is "0."

At the timing t1, the host controller 5 receives a host write request including a logical address A and write data including data B.

Ata timing t2, when the host write request and the write data are transmitted, the CPU 6 allocates a physical address "BL0, CL0" to the logical address "address A," and updates the address conversion information 7a accordingly. The CPU 6 transmits the host write request and the write data to the memory controller 10. The memory controller 10 accesses the nonvolatile memory 4, to write the data B to a location corresponding to the logical cluster CL0 of the logical block BL0.

In addition, when the host write request is transmitted, the block management unit 8 specifies the identification information "BL0" of the logical block corresponding to the logical address "address A" included in the host write request. According to the result of the specifying operation, the block management unit 8 determines to increment the number of valid clusters of the logical block BL0 by +1. Then, the block management unit 8 generates an update instruction including the update amount "+1" associated with the identification information "BL0" of the logical block, and supplies the update instruction to the memory controller 9.

At a timing t3, when the update instruction is received, the memory controller 9 reads "0" which is the number of valid clusters of the logical block BL0 corresponding to the update instruction, from the volatile memory 3. The memory controller 9 updates the read number of valid clusters "0" by the update amount "+1" corresponding to the update instruction. The memory controller 9 writes the updated number of valid clusters "1" back to the volatile memory 3. As a result, in the block management information 12 stored in the volatile memory 3, the number of valid clusters of the logical block BL0 is updated from "0" to "1."

At a timing t4, the host controller 5 receives a host write request including a logical address C and write data including data D.

At a timing t5, when the host write request and the write data are transmitted, the CPU 6 allocates a physical address "BL0, CL1" to the logical address "address C," and updates the address conversion information 7a accordingly. The CPU 6 transmits the host write request and the write data to the memory controller 10. The memory controller 10 accesses the nonvolatile memory 4 to write the data D to a location corresponding to the logical cluster CL1 of the logical block BL0.

In addition, when the host write request is transmitted, the block management unit 8 specifies the identification information "BL0" of the logical block corresponding to the logical address "address C" in the host write request. According to the result of the specifying operation, the block management unit 8 determines to increment the number of valid clusters of the logical block BL0 by +1. Then, the block management unit 8 generates an update instruction including the update amount "+1" associated with the identification information "BL0" of the logical block, and supplies the update instruction to the memory controller 9.

At a timing t6, when the update instruction is received, the memory controller 9 reads "1" which is the number of valid clusters of the logical block BL0 corresponding to the update instruction, from the volatile memory 3. The memory controller 9 updates the read number of valid clusters "1" by the update amount "+1" corresponding to the update instruction. The memory controller 9 writes the updated number of valid clusters "2" back to the volatile memory 3. As a result, in the block management information 12 stored in the volatile memory 3, the number of valid clusters of the logical block BL0 is updated from "1" to "2."

Referring now to FIG. 6B, at a timing t7, the host controller 5 receives a host write request including the logical address A and write data including data E.

Ata timing t8, when the host write request and the write data are transmitted, the CPU 6 allocates a physical address "BL1, CL0," instead of "BL0, CL0," to the logical address "address A," and updates the address conversion information 7a accordingly. That is, in the address conversion information 7a, the old association information that corresponds to the logical address "address A" is erased, and new association information in which the logical address "address A" is associated with the physical address "BL1, CL0" is added. The logical cluster CL0 of the logical block BL0 becomes invalid since the physical address thereof is not included in the address conversion information 7a. The CPU 6 transmits the host write request and the write data to the memory controller 10. The memory controller 10 writes the data E to the logical cluster CL0 of the logical block BL1.

In addition, when the host write request is transmitted, the block management unit 8 specifies the identification information "BL0" of the old logical block corresponding to the logical address "address A" in the host write request, and the identification information "BL1" of the new logical block. According to the result of the specifying operation, the block management unit 8 determines to decrement the number of valid clusters of the logical block BL0 by −1, and increment the number of valid clusters of the logical block BL1 by +1. Then, the block management unit 8 generates an update instruction including the update amount "−1" associated with the identification information "BL0" of the logical block and the update amount "+1" associated with the identification information "BL1" of the logical block, and supplies the update instruction to the memory controller 9.

At a timing t9, when the update instruction is received, the memory controller 9 reads "2" which is the number of valid clusters of the logical block BL0 corresponding to the update instruction, and "0" which is the number of valid clusters of the logical block BL1 corresponding to the update instruction, from the volatile memory 3. The memory controller 9 updates the read number of valid clusters "2" of the logical block BL0 by "−1" corresponding to the update instruction, and updates the read number of valid clusters "0" of the logical block BL1 by "+1" corresponding to the update instruction. The memory controller 9 writes the updated number of valid clusters "1" for the logical block BL0 and the updated number of valid clusters "1" for the logical block BL1, back to the volatile memory 3. As a result, in the block management information 12 stored in the volatile memory 3, the number of valid clusters of the logical block BL0 is updated from "2" to "1," and the number of valid clusters of the logical block BL1 is updated from "0" to "1."

Similarly, although not illustrated, association information between each of the logical addresses "F," "H," "J," and "L" and each of the physical addresses "BL1, CL3," "BL2, CL0," "BL2, CL2," and "BL2, CL3" is written in the address conversion information 7a. Data "G," "I," "K," and "M" are stored in the physical addresses "BL1, CL3," "BL2, CL0," "BL2, CL2," and "BL2, CL3" in the nonvolatile memory 4, respectively.

Accordingly, at a timing t10, in the block management information 12, the numbers of valid clusters of the logical blocks BL0, BL1, BL2, and BL3 are updated to "1," "2," "3," and "0," respectively. Note that FIGS. 6A and 6B omit the illustration of the association information between each of the logical addresses "F," "H," "J," and "L" and each of the physical addresses "BL1, CL3," "BL2, CL0," "BL2, CL2," and "BL2, CL3" in the address conversion information 7a, for the simplification of illustration.

Referring back to FIG. 5, when a garbage collection request is received from the CPU 6 (S8), the block management unit 8 transmits an instruction to acquire the block management information 12 to the memory controller 9 (S9).

Accordingly, the memory controller 9 accesses the volatile memory 3 (S10) to read the block management information 12 according to the acquisition instruction (S11). The memory controller 9 transmits the read block management information 12 to the block management unit 8 (S12).

By using the block management information 12, the block management unit 8 determines a block to be subjected to the garbage collection, from the multiple blocks in the nonvolatile memory 4 (S13). By referring to the block management information 12, the block management unit 8 may select a block in which the number of valid clusters is equal to or less than a threshold, among the multiple blocks, as a source block, or may select, in accordance with a policy, a block in increasing order of the number of valid clusters, among the multiple blocks excluding a free block, as a source block. By referring to the block management information 12, the block management unit 8 may specify a free block as a destination block. The block management unit 8 designates the source block and the destination block, generates an execution instruction to execute the garbage collection, and transmits the execution instruction to the memory controller 10 (S14).

Accordingly, the memory controller 10 accesses the nonvolatile memory 4 (S15), to instruct the nonvolatile memory to execute the garbage collection. According to the instruction, the nonvolatile memory 4 executes the garbage collection (S16). That is, the nonvolatile memory 4 executes a data migrating process that collects data of the valid clusters from the source block and rewrites the collected data to the destination block, and when the data migrating process is completed, the nonvolatile memory 4 executes a data erasing process on the source block so as to make the source block a free block.

For example, at a timing t11 illustrated in FIG. 6B, when the garbage collection request is received from the CPU 6, the block management unit 8 refers to the block management information 12 updated at the timing t10, and selects the blocks BL0 and BL1 in which the number of valid clusters is equal to or less than a threshold (e.g., 2), from the multiple blocks BL0 to BL3, as source blocks. Alternatively, the block management unit 8 refers to the block management information 12, and selects a predetermined number of blocks (e.g., two blocks BL0 and BL1) in increasing order of the number of valid clusters, among the multiple blocks BL0 to BL3 excluding a free block, as source blocks. By referring to the block management information 12, the block management unit 8 specifies the block BL3 in which the number of valid clusters is zero (i.e., a free block), as a destination block. The block management unit 8 designates the source blocks BL0 and BL1 and the destination block BL3, generates an execution instruction to execute the garbage collection, and transmits the execution instruction to the memory controller 10.

At a timing t12, when the execution instruction is received, the memory controller 10 accesses the nonvolatile memory 4, issues a command to execute the garbage collection, and supplies the command to the nonvolatile memory 4. According to the command, the nonvolatile memory 4 executes the garbage collection. That is, the nonvolatile memory 4 executes the data migrating process that collects data of the valid cluster CL1 from the source block BL0 and data of the valid clusters CL0 and CL3 from the source block BL1, and rewrites the collected data to the destination block BL3. When the data migrating process is completed, the nonvolatile memory 4 executes the data erasing process on the source blocks BL0 and BL1. As a result, the source blocks BL0 and BL1 may become free blocks, so that the storage area in the nonvolatile memory 4 can be effectively allocated.

Referring back to FIG. 5, when the garbage collection is completed, the nonvolatile memory 4 returns a completion notification to the memory controller 10 (S17). Accordingly, the memory controller 10 transmits the completion notification to the block management unit 8 (S18). The block management unit 8 transmits the completion notification to the CPU 6 (S19). As a result, the CPU 6 recognizes the completion of the garbage collection, and updates the address conversion information 7a. Further, in response to the completion notification, the block management unit 8 specifies the logical blocks that have been subjected to the data migrating process, and the logical blocks that have been subjected to the data erasing process (S20). The block management unit 8 generates an update instruction to update the number of valid clusters of each of the specified logical blocks, and supplies the update instruction to the memory controller 9 (S21). The instruction to update the number of valid clusters includes an update amount associated with identification information of each block. The identification information of a block (e.g., a logical block ID) includes identification information of a logical block in which the number of valid clusters is to be updated. The update amount includes an amount of the update of the number of valid clusters (e.g., increment (+1) or decrement (−1)).

Accordingly, the memory controller 9 accesses the volatile memory 3 (S22), to read the number of valid clusters corresponding to the update instruction (S23). The memory controller 9 updates the read number of valid clusters by the update amount corresponding to the update instruction, by using the addition/subtraction circuit 11 (S24). When the update amount corresponding to the update instruction is "+1," the addition/subtraction circuit 11 increments the number of valid clusters by +1. When the update amount corresponding to the update instruction is "−1," the addition/subtraction circuit 11 decrements the number of valid clusters by −1. The memory controller 9 writes the updated number of valid clusters back to the volatile memory 3 (S25). As a result, the block management information 12 stored in the volatile memory 3 can be updated.

For example, at a timing t13 illustrated in FIG. 6B, when the completion notification is transmitted, the CPU 6 allocates the physical address "BL3, CL1," instead of "BL0, CL1," to the logical address "address C" according to the change of the storage location of the data D, and updates the address conversion information 7a accordingly. According to the change of the storage location of the data E, the CPU 6 allocates the physical address "BL3, CL0," instead of "BL1, CL0," to the logical address "address A," and updates the address conversion information 7a accordingly. Although not illustrated, the CPU 6 also updates the address conversion information 7a according to a change of a storage location of data G.

In addition, when the completion notification is transmitted, the block management unit 8 specifies the logical blocks BL0, BL1, and BL3 that have been subjected to the data migrating process, and the logical blocks BL0 and BL1 that have been subjected to the data erasing process, according to the completion notification. According to the result of the specifying operation, the block management unit 8 determines to decrement the number of valid clusters of the logical block BL0 by −1 so as to become 0, decrement the number of valid clusters of the logical block BL1 by −2 so as to become 0, and increment the number of valid clusters of the logical block BL3 by +3 so as to become 3. Then, the block management unit 8 generates an update instruction including the update amount "−1" associated with the identification information "BL0" of the logical block, the update amount "−2" associated with the identification information "BL1" of the logical block, and the update amount "+3" associated with the identification information "BL3" of the logical block, and supplies the update instruction to the memory controller 9.

At a timing t14, when the update instruction is received, the memory controller 9 reads the number of valid clusters "1" of the logical block BL0, the number of valid clusters "2" of the logical block BL1, and the number of valid clusters "0" of the logical block BL3, which correspond to the update instruction, from the volatile memory 3. The memory controller 9 updates the read number of valid clusters "1" of the logical block BL0 by the update amount "−1" corresponding to the update instruction, updates the read number of valid clusters "2" of the logical block BL1 by "−2" corresponding to the update instruction, and updates the read number of valid clusters "0" of the logical block BL3 by the update amount "+3" corresponding to the update instruction. The memory controller 9 writes the updated number of valid clusters "0" for the logical block BL0, the updated number of valid clusters "0" for the logical block BL1, and the updated number of valid clusters "3" for the logical block BL3 back to the volatile memory 3. As a result, in the block management information 12 stored in the volatile memory 3, the number of valid clusters of the logical block BL0 is updated from "1" to "0," the number of valid clusters of the logical block BL1 is updated from "2" to "0," and the number of valid clusters of the logical block BL3 is updated from "0" to "3."

As described above, in the memory system 1 according to the embodiment, the operation to update the number of valid clusters in the controller 2 is performed by the memory controller 9 that serves as an I/F with respect to the volatile memory 3 outside the controller, rather than the block management unit 8. Thus, when the capacity of the nonvolatile memory 4 becomes large so that the data capacity of the block management information (valid cluster counter) 12 increases, the capacity of the volatile memory 7 in the controller 2 does not become large (and an increase in a cost for the memory system 1 can be avoided or mitigated), and the time for the process of updating the number of valid clusters can be readily reduced.

For example, as illustrated in FIG. 7, it is possible to reduce at least a transmission delay TP01 at the time when the number of valid clusters read from the volatile memory 3 is transmitted from the memory controller 9 to the block management unit 8, and a transmission delay TP02 at the time when the updated number of valid clusters is transmitted from the block management unit 8 to the memory controller 9. As a result, as compared to process time TP0 in a case where the block management unit 8 executes the updating operation, the present embodiment can implement the process of updating the number of valid clusters in process time TP1 reduced by ΔTP1.

In addition, if multiple times of operation to update the number of valid clusters are collectively executed, it can be expected to reduce the average frequency of access to the volatile memory 3 by the memory controller 9, and to further reduce the average process time for the process of updating the number of valid clusters.

Based on the above description, as illustrated in FIG. 8, a cache area 213 may be provided in the memory controller 9. FIG. 8 is a data flow diagram illustrating part of a configuration of a memory system 1 and an operation thereof according to a first modification of the embodiment. The cache area 213 may be implemented by, for example, an SRAM.

For example, a case where three instances of an operation to update the number of valid clusters are executed will be described. The block management unit 8 specifies a logical block corresponding to a first host write request (S1-1) (S2-1), generates a first update instruction to update the number of valid clusters, and supplies the update instruction to the memory controller 9 (S3-1). The memory controller 9 aggregates an update amount corresponding to the update instruction in association with identification information of each block, and stores the integrated (or aggregated) update amount that is associated with the identification information, in the cache area 213 (S201-1).

The block management unit 8 specifies a logical block corresponding to a second host write request (S1-2) (S2-2), generates a second update instruction to update the number of valid clusters, and supplies the update instruction to the memory controller 9 (S3-2). The memory controller 9 aggregates an update amount corresponding to the update instruction in association with identification information of each block, and stores the integrated update amount that is associated with the identification information, in the cache area 213 (S201-2).

The block management unit 8 specifies a logical block corresponding to a third host write request (S1-3) (S2-3), generates a third update instruction to update the number of valid clusters, and supplies the update instruction to the memory controller 9 (S3-3). The memory controller 9 aggregates an update amount corresponding to the update instruction in association with identification information of each block, and stores the integrated update amount that is associated with the identification information, in the cache area 213 (S201-3).

The memory controller 9 accesses the volatile memory 3 (S4) to read the number of valid clusters corresponding to the update instruction from the volatile memory 3 (S5). The memory controller 9 updates the read number of valid clusters by the integrated update amount, by using the addition/subtraction circuit 11 (S6). The memory controller 9 writes the updated number of valid clusters back to the volatile memory 3 (S7). As a result, the block management information 12 stored in the volatile memory 3 can be updated.

For example, in the example of the operation illustrated in FIGS. 6A and 6B, in response to the host write request at the timing t1, the update instruction including the update amount "+1" associated with the identification information "BL0" of the logical block is supplied to the memory controller 9 at the timing t2.

At the timing t3, when the update instruction is received, the memory controller 9 generates an integrated update amount "+1" associated with the identification information "BL0" of the logical block, and stores the integrated update amount in the cache area 213.

In response to the host write request at the timing t4, the update instruction including the update amount "+1" associated with the identification information "BL0" of the logical block is supplied to the memory controller 9 at the timing t5.

At the timing t6, when the update instruction is received, the memory controller 9 reads the integrated update amount from the cache area 213, and adds the update amount "+1" to the integrated update amount "+1" that is associated with the identification information "BL0" of the logical block, so as to obtain the integrated update amount "+2." The memory controller 9 stores the integrated update amount "+2" that is associated with the identification information "BL0" of the logical block, in the cache area 213.

In response to the host write request at the timing t7, the update instruction including the update amount "−1" associated with the identification information "BL0" of the logical block and the update amount "+1" associated with the identification information "BL1" of the logical block is supplied to the memory controller 9 at the timing t8.

At the timing t9, when the update instruction is received, the memory controller 9 reads the integrated update amount from the cache area 213, and adds the update amount "−1" to the integrated update amount "+2" that is associated with the identification information "BL0" of the logical block, so as to obtain the integrated update amount "+1." The memory controller 9 stores the integrated update amount "+1" that is associated with the identification information "BL0" of the logical block, in the cache area 213. Further, the memory controller 9 adds the update amount "+1" to the integrated update amount "0" that is associated with the identification information "BL1" of the logical block, so as to obtain the integrated update amount "+1." The memory controller 9 stores the integrated update amount "+1" that is associated with the identification information "BL1" of the logical block, in the cache area 213.

Then, the memory controller 9 reads the number of valid clusters "0" of the logical block BL0 and the number of valid clusters "0" of the logical block BL1, from the volatile memory 3. The memory controller 9 updates the read number of valid clusters "0" of the logical block BL0 by the integrated update amount "+1" corresponding to the first to third update instructions, and updates the read number of valid clusters "1" of the logical block BL1 by the integrated update amount "+1" corresponding to the first to third update instructions. The memory controller 9 writes the updated number of valid clusters "1" for the logical block BL0 and the updated number of valid clusters "2" for the logical block BL1, back to the volatile memory 3. As a result, in the block management information 12 stored in the volatile memory 3, the number of valid clusters of the logical block BL0 is updated from "0" to "1," and the number of valid clusters of the logical block BL1 is updated from "0" to "2."

In this way, when multiple instances of update operations to update the number of valid clusters are executed, it is possible to reduce the average frequency of access to the volatile memory 3 by the memory controller 9, and to further reduce the average process time for the process of updating the numbers of valid clusters.

Figure 9:
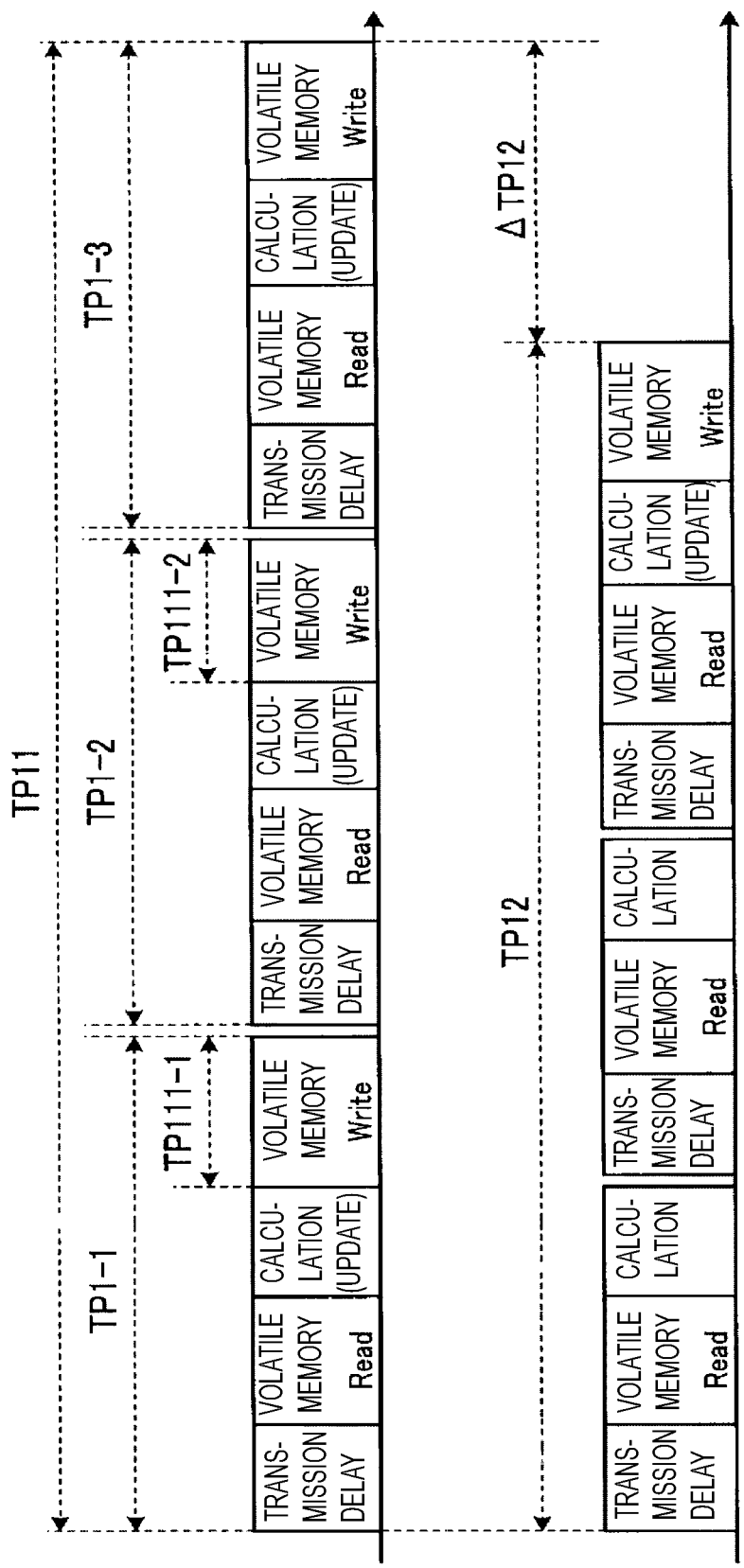
FIG. 9 is a view illustrating an improved efficiency of an operation of the memory system according to the first modification of the embodiment.

For example, as illustrated in FIG. 9, in instances TP1-1 and TP1-2 for the respective updating processes excluding the last of the updating processes, at least operations TP111-1 and TP111-2 for writing the updated number of valid clusters to the volatile memory 3 can be shortened. As a result, as compared to process time TP11 in a case where the updating operation is executed each time, the first modification of the embodiment can implement the process of updating the number of valid clusters in process time TP12 reduced by ΔTP12.

In addition, a trigger condition to update the number of valid clusters collectively for multiple instances of update operations may include, for example: when the number of instances of the update operations reaches a predetermined number; when the data capacity of the integrated update amount reaches the storage capacity of the cache area 213; and at the time of the garbage collection.

When the multiple times of operation to update the number of valid clusters are executed at the time of the garbage collection, the following operation may be executed. At the time of the garbage collection, the CPU 6 accesses the volatile memory 3 via the block management unit 8 and the memory controller 9 to read the number of valid clusters. The memory controller 9 checks whether an entry on a logical block of a read target exists in the cache area 213, and executes the addition/subtraction process as necessary. Alternatively, an integrated value corresponding to the result of the garbage collection may be stored in the cache area 213 and written back to the volatile memory 3 during free time such as idle time. With this configuration, the frequency of access to the volatile memory (DRAM) 3 can be reduced.

In addition, in a case where the volatile memory 3 has multiple refresh areas, when the memory access for updating the number of valid clusters is executed on a refresh area that is not being refreshed, it can be expected to effectively execute the process of updating the number of valid clusters in relation to the refreshing process of the volatile memory 3.

Figure 10:
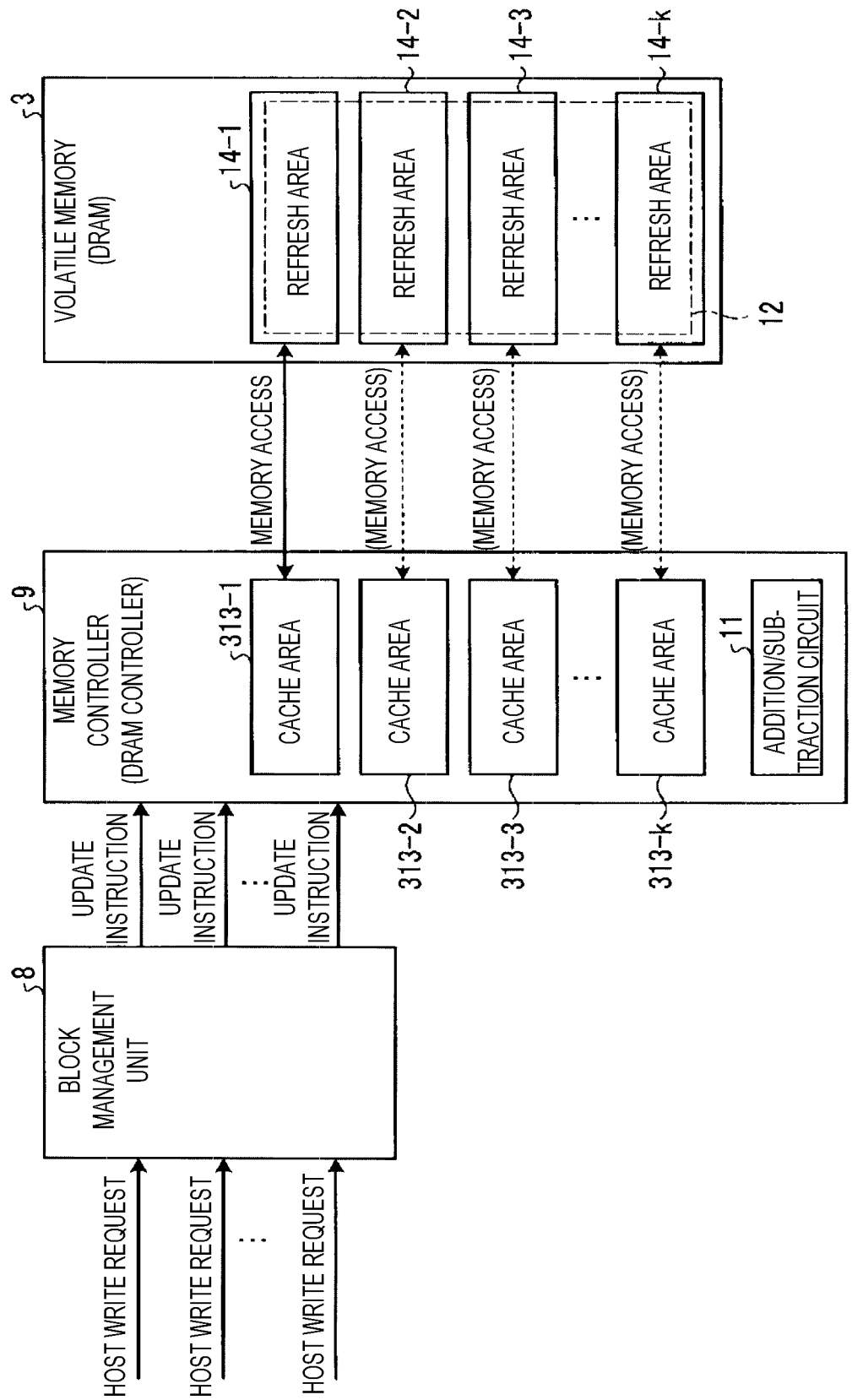
FIG. 10 is a data flow diagram illustrating part of a configuration of a memory system and an operation thereof according to a second modification of the embodiment.

Based on the above description, as illustrated in FIG. 10, when the volatile memory 3 has multiple refresh areas 14-1 to 14-$k$ ($k$ is an integer of 2 or more), cache areas 313-1 to 313-$k$ may be provided in the memory controller 9. Each refresh area 14 is an area that serves as a unit for executing the refreshing process in the volatile memory 3, that is, a process of periodically charging a memory cell. Each refresh area 14 may be, for example, a DIMM area (i.e., an area that serves as a unit of power supply), a rank area (i.e., an area that serves as a single memory chip), or a bank area (an area that serves as a unit in which the memory controller 9 manages the volatile memory 3).

For example, the CPU 6 divides the address space of the storage area in the nonvolatile memory 4 by a size of a logical block to correspond to the number of refresh areas (k refresh areas), and allocates the k refresh areas 14-1 to 14-$k$ to the k cache areas 313-1 to 313-$k$, respectively.

When the memory system 1 is powered on, the CPU 6 controls the memory controllers 9 and 10 to read the block management information 12 stored in the management information storage area of the nonvolatile memory 4 and store the read block management information 12 in the volatile memory 3. The CPU 6 implements control processes such that the records of each logical block in the block management information 12 (association information between logical block IDs and the number of valid clusters) are stored in a refresh area 14 allocated to the corresponding logical block. FIG. 10 illustrates an example where the block management information 12 is stored across the k refresh areas 14-1 to 14-$k$ in the volatile memory 3.

Under the control of the CPU 6, the memory controller 9 stores an integrated update amount for the number of valid clusters of each logical block in the cache area 313 corresponding to the logical block, according to the association relationship between the multiple logical blocks and the k cache areas 313-1 to 313-$k$. When a timing for updating the number of valid clusters is reached, the memory controller 9 reads the number of valid clusters from the refresh area 14 corresponding to the cache area 313, updates the read number of valid clusters by the integrated update amount that is stored in the cache area 313, and writes the updated number of valid clusters back to the refresh area 14. The CPU 6 may implement control processes such that the process of writing the updated number of valid clusters back to the refresh area 14 is executed in parallel with the refreshing process on another refresh area 14.

Figure 11:
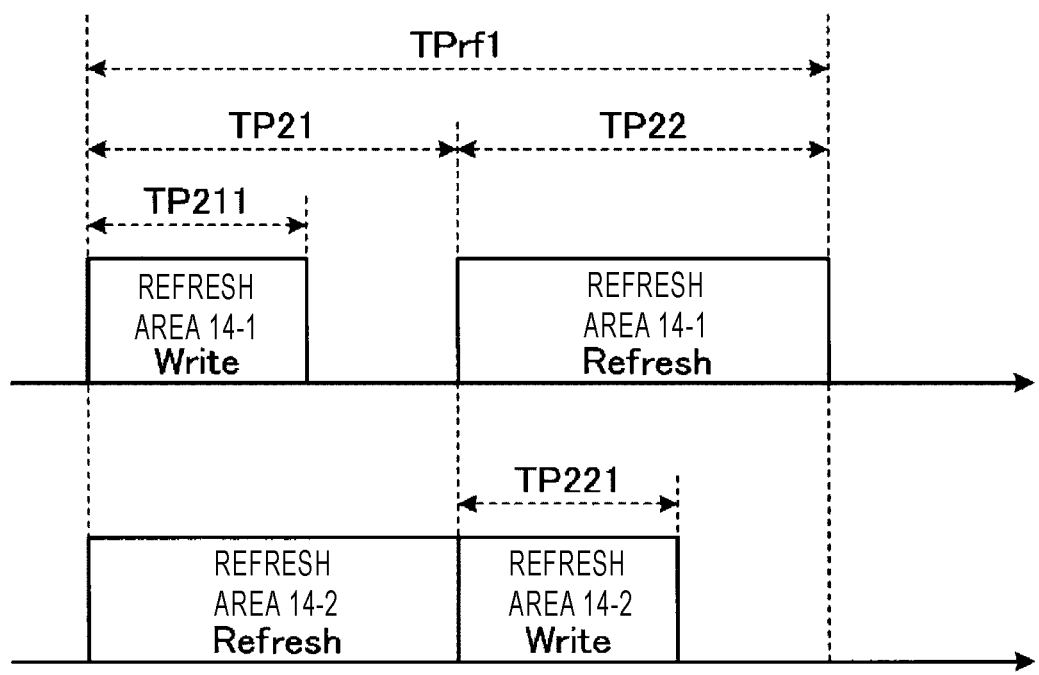
FIG. 11 is a view illustrating an improved efficiency of an operation of the memory system according to the second modification of the embodiment.

For example, when k=2, as illustrated in FIG. 11, the process of updating the number of valid clusters and the refreshing process on the volatile memory 3 may be executed in parallel. FIG. 11 is a view illustrating an improved efficiency of an operation of a memory system according to a second modification of the embodiment (when k=2). That is, a total refresh time TPrf1 includes a refresh time TP21 of the refresh area 14-2 and a refresh time TP22 of the refresh area 14-1.

Under the control of the CPU 6, the memory controller 9 writes the number of valid clusters updated by the integrated update amount stored in the cache area 313-1 back to the refresh area 14-1, in the refresh time TP21 of the refresh area 14-2. The memory controller 9 writes the number of valid clusters updated by the integrated update amount stored in the cache area 313-2 back to the refresh area 14-2, in the refresh time TP22 of the refresh area 14-1.

As a result, it is possible to perform the process of writing the number of valid clusters updated by the integrated update amount in the cache area 313-1 back to the refresh area 14-1 (which takes time TP211) during the refresh time TP21 of the refresh area 14-2, and to perform the process of writing the number of valid clusters updated by the integrated update amount in the cache area 313-2 back to the refresh area 14-2 (which takes time TP221) during the refresh time TP22 of the refresh area 14-1.

Figure 12:
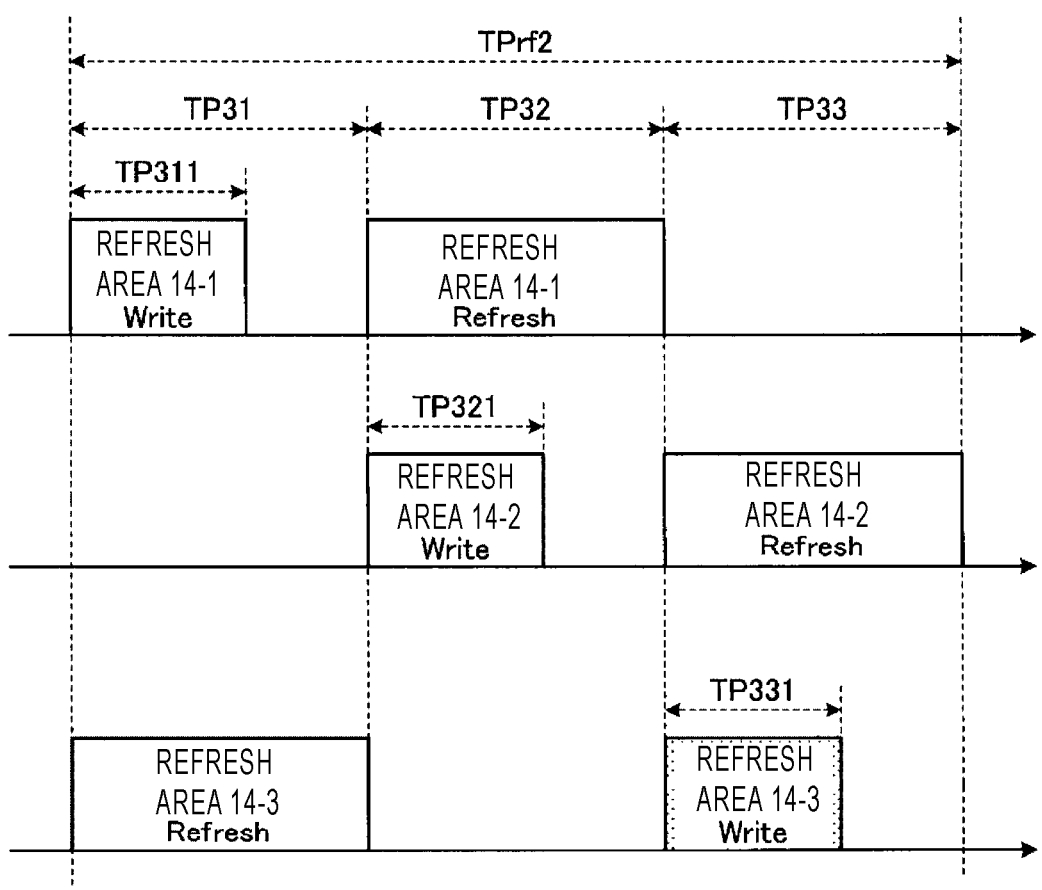
FIG. 12 is a view illustrating an improved efficiency of an operation of the memory system according to the second modification of the embodiment.

In some embodiments, for example, when k=3, as illustrated in FIG. 12, the process of updating the number of valid clusters and the refreshing process on the volatile memory 3 may be performed in parallel. FIG. 12 is a view illustrating an improved efficiency of an operation of the memory system according to the second modification of the embodiment (when k=3). That is, a total refresh time TPrf2 includes a refresh time TP31 of the refresh area 14-3, a refresh time TP32 of the refresh area 14-1, and a refresh time TP33 of the refresh area 14-2.

Under the control of the CPU 6, the memory controller 9 writes the number of valid clusters updated by the integrated update amount stored in the cache area 313-1 back to the refresh area 14-1, in the refresh time TP31 of the refresh area 14-3. The memory controller 9 writes the number of valid clusters updated by the integrated update amount stored in the cache area 313-2 back to the refresh area 14-2, in the refresh time TP32 of the refresh area 14-1. The memory controller 9 writes the number of valid clusters updated by the integrated update amount in the cache area 313-3 back to the refresh area 14-3, in the refresh time TP33 of the refresh area 14-2.

As a result, it is possible to perform the process of writing the number of valid clusters updated by the integrated update amount in the cache area 313-1 back to the refresh area 14-1 (which takes time TP311) during the refresh time TP31 of the refresh area 14-3, to perform the process of writing the number of valid clusters updated by the integrated update amount in the cache area 313-2 back to the refresh area 14-2 (which takes time TP321) during the refresh time TP32 of the refresh area 14-1, and to perform the process of writing the number of valid clusters updated by the integrated update amount in the cache area 313-3 back to the refresh area 14-3 (which takes time TP331) during the refresh time TP33 of the refresh area 14-2.

In this way, the multiple cache areas are provided in the memory controller 9 in association with the multiple refresh areas in the volatile memory (DRAM) 3, and the memory access by the memory controller 9 to update the number of valid clusters is executed to a refresh area which is not a refreshing target. Thus, the time for the memory access for updating the number of valid clusters can be "hidden" in the time for the refreshing process, so that the loss of the process time due to a purge of the cache area 313 in the memory controller 9 becomes invisible. As a result, the process of updating the number of valid clusters can be effectively performed in relation to the process of refreshing the volatile memory 3.

In some embodiments, in a case where a block in which the number of valid clusters is equal to or less than a threshold becomes a source block of the garbage collection, if the comparison with the threshold as to a logical block is performed at the time when the number of valid clusters is updated, to determine whether the logical block becomes the source block of the garbage collection, it can be expected to reduce the time for the process of garbage collection from a reception of the garbage collection request until a return of the completion notification.

Figure 13:
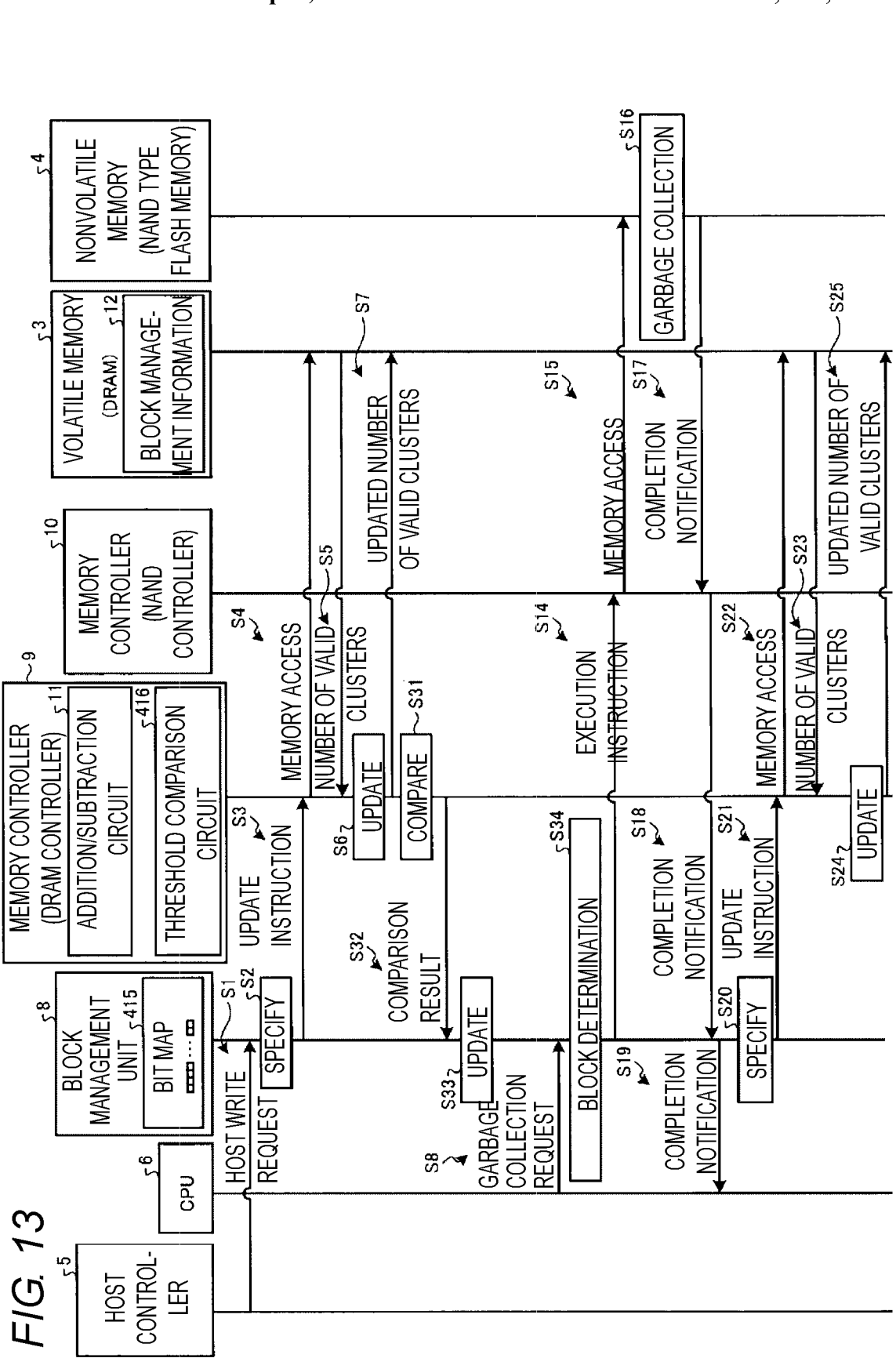
FIG. 13 is a sequence diagram illustrating part of a configuration of a memory system and an operation thereof according to a third modification of the embodiment.

Based on the above description, as illustrated in FIG. 13, a threshold comparison circuit 416 may be provided in the memory controller 9, and the block management unit 8 may store a bit map 415 representing a source block of the garbage collection. FIG. 13 is a sequence diagram illustrating part of a configuration of a memory system 1 and an operation thereof according to a third modification of the embodiment. The threshold comparison circuit 416 has a threshold preset by the CPU 6, and compares the number of valid clusters updated in the memory controller 9 with the threshold. The bit map 415 has as many bits as the number of blocks included in the nonvolatile memory 4. In the bit map 415, each bit position is associated with identification information of a logical block, and the bit value represents whether the logical block becomes the source block (e.g., the bit value "1" represents that the logical block is the source block, and the bit value "0" represents that the logical block is not the source block).

For example, after S1 to S7 are executed as in the embodiment described above, the threshold comparison circuit 416 of the memory controller 9 compares the updated number of valid clusters with the threshold (S31). The threshold used for the comparison may be set in advance (e.g., prior to S31) in the threshold comparison circuit 416 by the CPU 6. The threshold comparison circuit 416 supplies the comparison result to the block management unit 8 (S32). The comparison result includes identification information of the logical block and information of whether the number of valid clusters of the logical block is equal to or less than the threshold.

The block management unit 8 updates the bit map 415 by using the comparison result (S33). That is, the block management unit 8 extracts the identification information of the logical block from the comparison result, and refers to the bit position associated with the identification information of the logical block in the bit map 415. When the comparison result includes information indicating that the number of valid clusters is equal to or less than the threshold, the block management unit 8 updates the bit value of the corresponding bit position to "1," and when the comparison result includes information indicating that the number of valid clusters is larger than the threshold, the block management unit 8 updates the bit value of the corresponding bit position to "0."

Accordingly, when the garbage collection request is received from the CPU 6 (S8), the block management unit 8 refers to the bit map 415 and determines a block to be subjected to the garbage collection among the multiple blocks in the nonvolatile memory 4 (S34). Then, S14 to S25 are executed as in the embodiment described above.

With the above-described configuration and operation, it is possible to eliminate or reduce the access to the volatile memory 3 when the block to be subjected to the garbage collection is determined. Thus, it is possible to reduce the time for the process of garbage collection from the reception of the garbage collection request until the return of the completion notification.

Further, a block in which the number of valid clusters is small can be searched at a high speed by such a process using hardware. That is, it is possible to readily reduce the process time for the update of the bit map 415 which is executed prior to the reception of the garbage collection request.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A memory system comprising:
    a first volatile semiconductor memory;
    a second nonvolatile semiconductor memory that includes a plurality of blocks each including a plurality of clusters; and
    a controller configured to store management information in the first volatile semiconductor memory in which identification information of the blocks and corresponding numbers of valid clusters of the blocks are stored and respectively associated with each other,
    wherein the controller includes:
        a block management unit configured to generate an update instruction to update the number of valid clusters associated with a block in which data is to be written, according to a write request received from a host, and
        a first memory controller configured to read, from the first volatile semiconductor memory, the number of valid clusters corresponding to the update instruction, update the read number of valid clusters by an update amount corresponding to the update instruction, and write the updated number of valid clusters back to the first volatile semiconductor memory.

2. The memory system according to claim 1, wherein the first memory controller includes an addition/subtraction circuit configured to add or subtract the read number of valid clusters.

3. The memory system according to claim 1, wherein the controller further includes a host controller configured to transmit a write completion notification corresponding to the write request to the host, before the write-back of the updated number of valid clusters is completed after the update instruction is generated.

4. The memory system according to claim 1, wherein the block management unit is configured to designate a source block and a destination block among the plurality of blocks, and generate an execution instruction to execute garbage collection, by using the management information including the updated number of valid clusters, and
    the controller further includes a second memory controller configured to supply a command to instruct a process of reading data of valid clusters from the source block in the second nonvolatile semiconductor memory and writing the data of the valid clusters to the destination block in the second nonvolatile semiconductor memory according to the execution instruction.

5. The memory system according to claim 1, wherein the first memory controller includes a cache area configured to store an integrated update amount obtained by integrating the update amount corresponding to the update instruction.

6. The memory system according to claim 5, wherein the first memory controller is configured to update the read number of valid clusters by the stored integrated update amount.

7. The memory system according to claim 5, wherein the first volatile semiconductor memory includes a plurality of refresh areas, and the first memory controller includes a plurality of cache areas corresponding to the plurality of refresh areas.

8. The memory system according to claim 7, wherein the plurality of refresh areas include a first refresh area and a second refresh area,
    the plurality of cache areas include a first cache area corresponding to the first refresh area, and a second cache area corresponding to the second refresh area, and
    the first memory controller is configured to update the number of valid clusters read from the second refresh area by an integrated update amount stored in the second cache area and write the updated number of valid clusters back to the second refresh area in a first time period when a refreshing process is performed in the first refresh area of the first volatile semiconductor memory.

9. The memory system according to claim 8, wherein the first memory controller is configured to update the number of valid clusters read from the first refresh area by an integrated update amount stored in the first cache area and write the updated number of valid clusters back to the first refresh area in a second time period when the refreshing process is performed in the second refresh area of the first volatile semiconductor memory.

10. The memory system according to claim 9, wherein the plurality of refresh areas further include a third refresh area, the plurality of cache areas further include a third cache area corresponding to the third refresh area, and the first memory controller updates the number of valid clusters read from the third refresh area by an integrated update amount stored in the third cache area and writes the updated number of valid clusters back to the third refresh area in the second time period when the refreshing process is performed in the second refresh area of the first volatile semiconductor memory.

11. A memory system comprising:
a first semiconductor memory storing block management information that includes a valid cluster counter;
a second semiconductor memory that includes a plurality of blocks each including a plurality of clusters; and
a controller including:
  a memory controller configured to interface with the first semiconductor memory, and to update the valid cluster counter of the block management information; and
  a block management unit configured to generate an update instruction to update the number of valid clusters associated with a block in which data is to be written, according to a write request received from a host, and to transmit the instruction to the memory controller,
wherein the memory controller and the block management unit are packaged as part of the controller, and the first semiconductor memory and the second semiconductor memory are disposed outside of the controller.

12. The memory system of claim 11, wherein the memory controller includes an addition/subtraction circuit configured to update the valid cluster counter by an update amount corresponding to the update instruction.

13. The memory system of claim 11, wherein:
the memory controller is configured to read the block management information of the first semiconductor memory, and to transmit a read portion of the block management information to the block management unit.

14. The memory system of claim 13, wherein the block management unit is configured to determine a source block for a garbage collection process based on the read portion of the block management information.

15. The memory system of claim 14, wherein the block management unit is configured to select as the source block a block for which the block management information indicates the number of valid clusters is equal to or less than a threshold.

16. The memory system of claim 14, wherein the block management unit is configured to select the source block based on a policy of selecting blocks in increasing order of the number of valid clusters.

17. The memory system of claim 11, wherein the first semiconductor memory is a volatile memory and the second semiconductor memory is a nonvolatile memory.

18. A method for managing a memory system comprising a first volatile semiconductor memory, a second nonvolatile semiconductor memory that includes a plurality of blocks each including a plurality of clusters, and a controller, the method comprising:
storing management information in the first volatile semiconductor memory in which identification information of the blocks and corresponding numbers of valid clusters of the blocks are stored and respectively associated with each other;
generating an update instruction to update the number of valid clusters associated with a block in which data is to be written, according to a write request received from a host;
reading, from the first volatile semiconductor memory, the number of valid clusters corresponding to the update instruction;
updating the read number of valid clusters by an update amount corresponding to the update instruction; and
writing the updated number of valid clusters back to the first volatile semiconductor memory.

19. The method of claim 18, further comprising transmitting a write completion notification corresponding to the write request to the host, before the write-back of the updated number of valid clusters is completed after the update instruction is generated.

20. The method of claim 18, wherein:
the first volatile semiconductor memory includes a plurality of refresh areas including a first refresh area and a second refresh area, and
the controller includes a plurality of cache areas configured to store an integrated update amount obtained by integrating the update amount corresponding to the update instruction, the plurality of cache areas corresponding to the plurality of refresh areas and including a first cache area corresponding to the first refresh area and a second cache area corresponding to the second refresh area, and
the method further comprises:
  updating the number of valid clusters read from the second refresh area by an integrated update amount stored in the second cache area; and
  writing the updated number of valid clusters back to the second refresh area in a time period when a refreshing process is performed in the first refresh area of the first volatile semiconductor memory.

* * * * *